United States Patent [19]

Gezari

[11] 3,910,449

[45] Oct. 7, 1975

[54] SANITARY HOLDING SUMP AND METHOD OF MAKING

[75] Inventor: Walter A. Gezari, Killingworth, Conn.

[73] Assignee: International Telephone and Telegraph Corporation, New York, N.Y.

[22] Filed: May 6, 1974

[21] Appl. No.: 467,469

Related U.S. Application Data

[60] Division of Ser. No. 307,230, Nov. 16, 1972, Pat. No. 3,808,996, which is a division of Ser. No. 122,721, March 10, 1971, Pat. No. 3,722,538, which is a continuation-in-part of Ser. No. 24,789, Aug. 1, 1970, abandoned.

[52] U.S. Cl. .............. 220/9 F; 114/74 A; 215/13 R
[51] Int. Cl.² ......................................... B65D 25/18
[58] Field of Search ............ 220/9 F, 15; 114/74 A, 114/.5 R

[56] References Cited
UNITED STATES PATENTS

| | | | |
|---|---|---|---|
| 3,069,041 | 12/1962 | Musso et al. | 220/9 F |
| 3,298,554 | 1/1967 | Piker | 220/9 F |
| 3,501,055 | 3/1970 | Jurion et al. | 220/9 F |

*Primary Examiner*—Duane A. Reger
*Assistant Examiner*—Gregory W. O'Connor
*Attorney, Agent, or Firm*—Thomas L. Peterson

[57] ABSTRACT

A sanitary holding sump which can be formed in a blind cavity such as a toilet sump below an interior deck of a boat. The sump is formed with a laminated construction including two plastic bags, one within the other, and an intermediate plastic foam filler which has been cured to a rigid state. The top of the sump is sealed to the bulkhead and includes a ducted two-part cover plate for receiving and discharging waste material. The sump is formed below an interior deck by installing a first plastic bag connected to a first flange through an aperture in the interior deck, then placing a charge of foaming plastic resin in a substantially liquid state in the first bag, and then installing a second plastic bag connected to a second flange which covers the first flange. The inner bag is then pressurized internally, displacing the foaming resin in the outer bag and distributing it substantially evenly throughout the entire cavity or space between the two bags. Some expansion of the outer bag is accomplished by means of the foaming action of the resin. The resin eventually sets in its foamed state to provide the structural rigidity of the sump.

2 Claims, 11 Drawing Figures

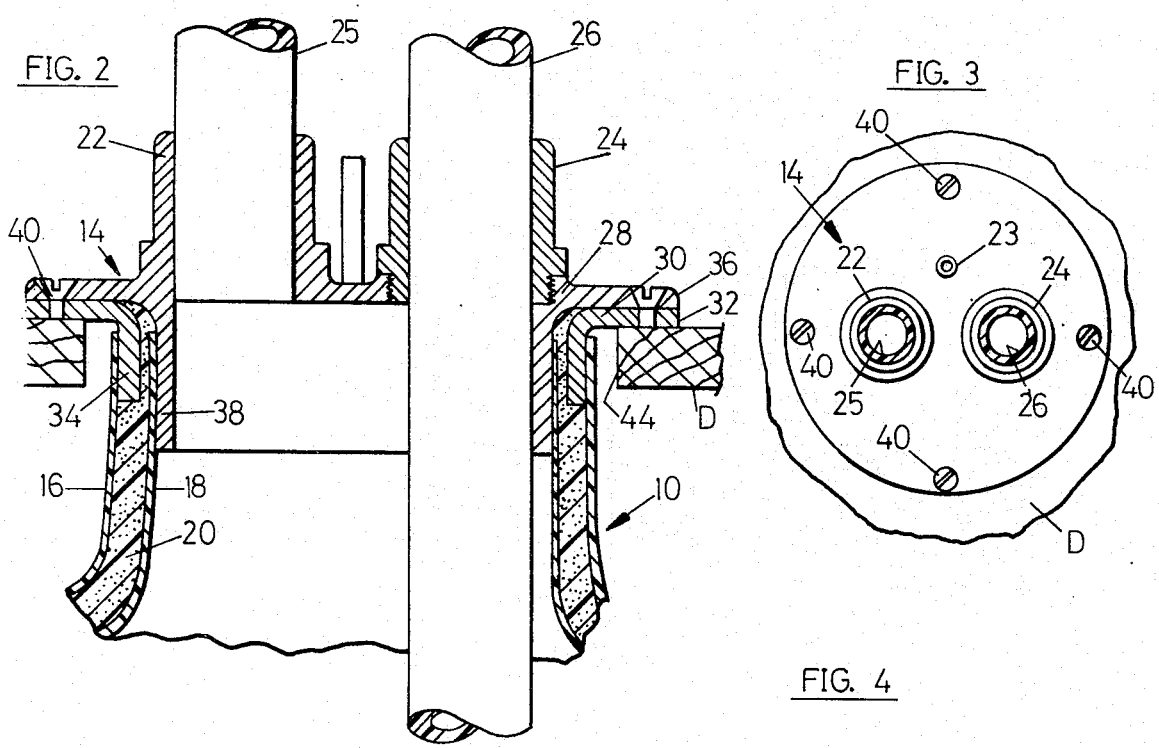
FIG. 2
FIG. 3
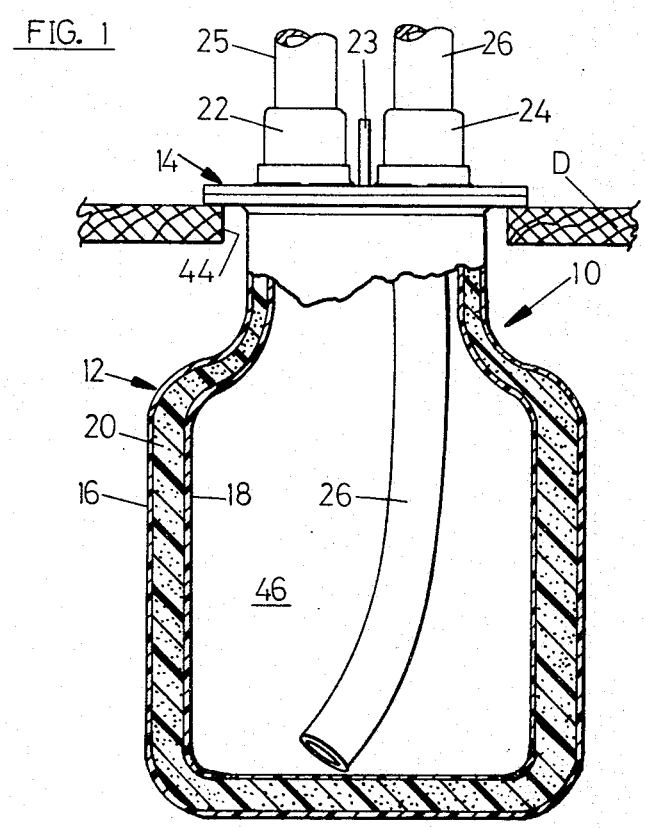
FIG. 1
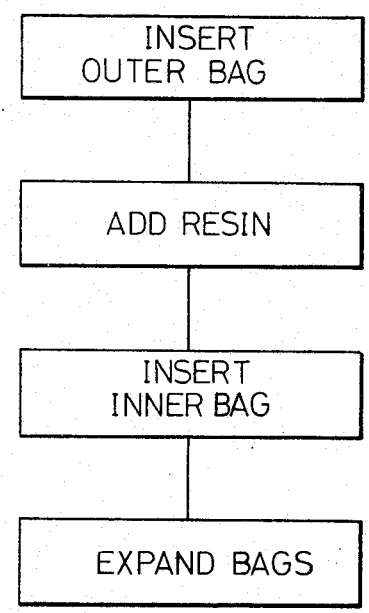
FIG. 4
INSERT OUTER BAG
ADD RESIN
INSERT INNER BAG
EXPAND BAGS

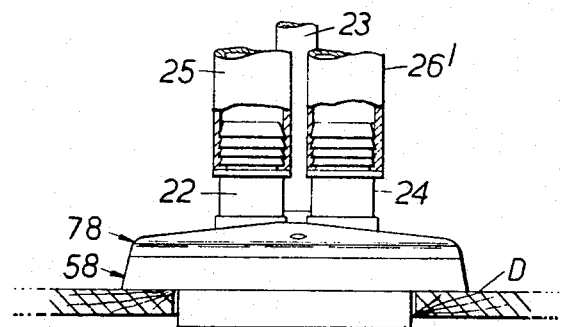
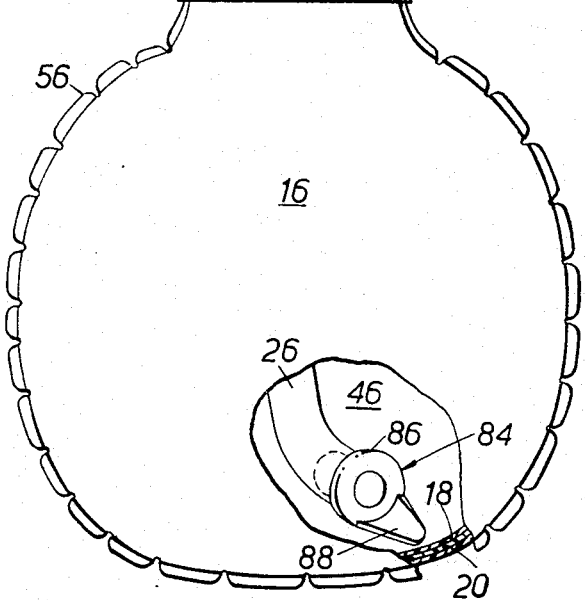
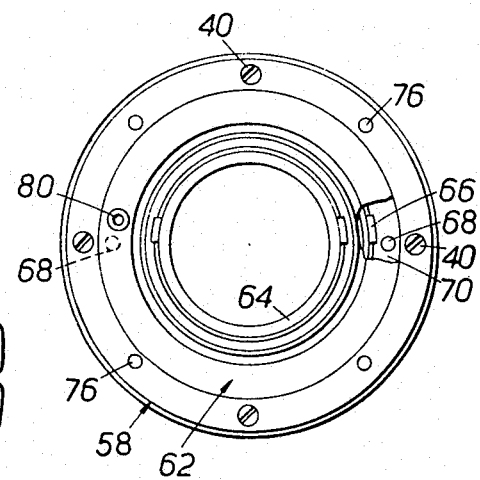
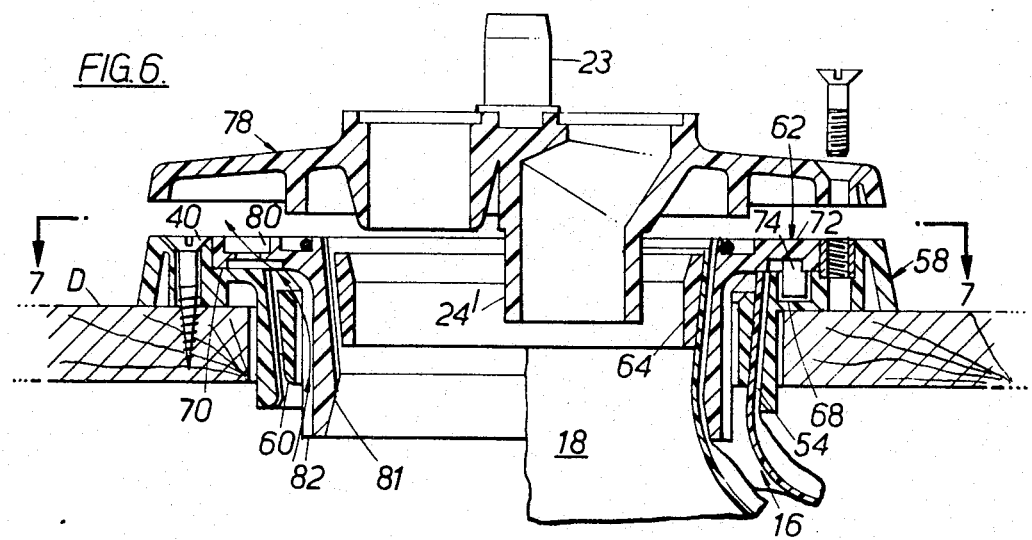

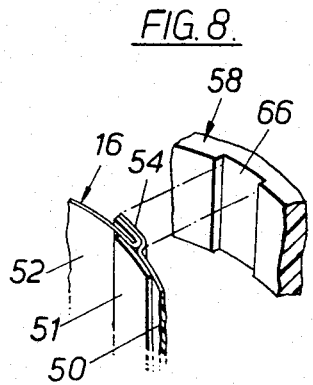
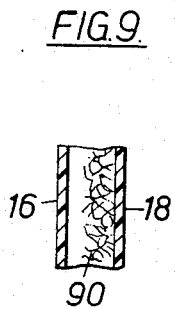
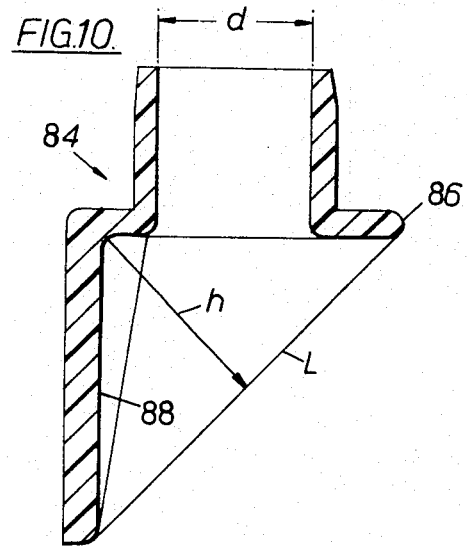
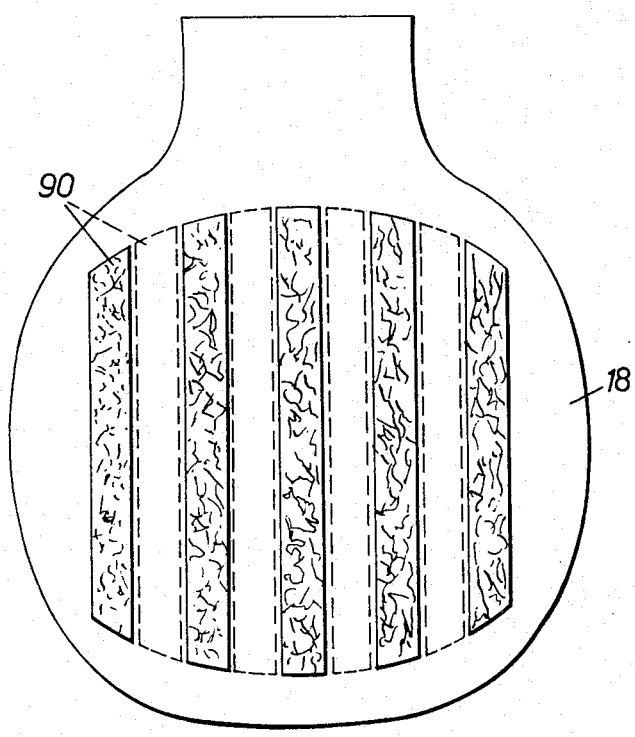

SANITARY HOLDING SUMP AND METHOD OF MAKING

CROSS-REFERENCE TO RELATED APPLICATIONS

This is a division of application Ser. No. 307,230 filed Nov. 16, 1972, now U.S. Pat. No. 3,808,996, which is a division of application Ser. No. 122,721 filed Mar. 10, 1971, now U.S. Pat. No. 3,722,538, which is a continuation-in-part of application Ser. No. 24,789 filed Aug. 1, 1970, now abandoned.

BACKGROUND OF THE INVENTION

1. Field of the Invention

This invention relates to fluid storage tanks. More specifically, the present invention is directed to liquid holding tanks and the fabrication of such tanks in situ. Accordingly, the general objects of the present invention are to provide novel and improved apparatus and methods of such character.

2. Description of the Prior Art

While not limited thereto in its utility, the present invention is particularly well suited for use as a sanitary sump for a marine vessel. Thus, while the invention may, for example, also be employed as a fuel or water holding tank, it will be described hereinafter in the environment of a waste holding tank of the type found in boats. Such tanks or sumps must be periodically emptied of waste material. Current emphasis on pollution has included an attack by ecologists on the contamination of rivers, lakes and other bodies of water by means of waste material discharged from factories, sewage systems and also vessels which travel through these bodies of water. It has been a common practice in the past to simply discharge waste material through underwater conduits with the intention that the waste material will either settle in the water or be diluted by the water to the point where it is no longer objectionable. With the tremendous increase in pollution, however, it is a common practice to establish regulations which prevent such discharge of waste material in all bodies of water regardless of their size or usage. Such regulations require that boats having toilets may no longer employ these facilities without modifying the plumbing systems to prevent overboard dumping of waste materials. This entails the installation of a sanitary holding sump within the boat and connected to the toilets or other washroom fixtures to receive any waste material discharged therefrom. The sumps are used to temporarily store the waste material and are periodically emptied by pumping the sewage from the sanitary sump to a land based sewage system.

The installation of such holding sumps in an older vessel may be a costly process. It is usually desirable to locate the sumps in the lower portions of the boat hold which have the capacity and available space for such sumps. The installation of a large sump may require extensive cutting and removing of existing interior deck and bulkhead structures if a rigid tank is to be installed. Furthermore, it may be necessary to custom build a sump so that it fits precisely within a selected area of a boat hold where space is available.

It is accordingly an object of the present invention to disclose a fluid holding tank for a vessel which can be installed in a blind cavity below an interior deck without extensive cutting and removal of the interior deck.

It is a further object of the present invention to disclose a fluid holding tank which can be installed in blind cavities having a variety of shapes.

It is still a further object of the present invention to disclose a fluid holding tank which can be installed through an aperture in an interior deck not substantially larger than the mounting aperture required for ducting fluid into and out of the tank.

It is still a further object of the present invention to disclose a tank which can be formed by means of generally flexible elements and a synthetic resin.

SUMMARY OF THE INVENTION

The present invention comprises a novel and improved holding tank and the method of manufacture thereof which overcomes the above-briefly discussed disadvantages of the prior art and achieves the stated objects. The fluid holding tank of the present invention is comprised of two heavy gauge plastic bags, one within the other, and a plastic resin which provides the structural rigidity of the tank. The plastic resin, which may be either a self-foaming material or a fully expanded foam material, is disposed between the plastic bags and, in the manner to be described below, will assume the requisite tank shape prior to setting. The plastic resin may possess adhesive properties which maintain the inner bag in an expanded state. The plastic bags form the inside and outside walls of the tank, with the resin providing an intermediate structurally rigid filler in the laminated construction. A flange device serves as a tank cover and connector and includes apertures through which waste material can be emptied into and removed from the tank and a vent through which air can be drawn in and gases vented. The plastic bags which form the inside and outside walls of the tank are separately and coaxially connected to the flange device so that they may be separately inserted through and secured to a mounting aperture in the interior deck of a ship.

The installation of the fluid holding tank in a blind cavity under an interior deck is accomplished by first inserting a first flexible plastic bag, which eventually forms the outside wall of the tank, through the aperture in the interior deck. The first bag is then partially filled with a suitable synthetic resin. Before the resin is cured or substantially converted to its foamed state, the second plastic bag is inserted through the aperture and into the first bag and is filled with water or pressurized with compressed air if available. The pressurizing of the second bag within the first bag causes the first bag to expand within the cavity below the interior deck. The expansion of the inner (i.e. second) bag displaces the foam and distributes it substantially evenly throughout the entire cavity or space between the two bags.

The quantity of resin with which the first bag is charged is selected so that it will occupy all of the space between the second bag and the first bag to form the laminate construction. The resin is then allowed to cure or set to provide the structural rigidity and shape of the sump. The outer (first) bag is attached to a flange element which forms a connection to the interior deck. The inner (second) bag is attached to a flange element which is concentric with the outer (first) flange.

BRIEF DESCRIPTION OF THE DRAWING:

The present invention may be better understood and its numerous objects and advantages will become apparent to those skilled in the art by reference to the accompanying drawing wherein like reference numerals refer to like elements throughout the several figures and in which:

FIG. 1 is a cross-sectional view of a first embodiment of a holding tank installed in a blind cavity below an interior deck;

FIG. 2 is a cross-sectional view of the embodiment of FIG. 1 showing mounting details, and the two-part flange assembly including fluid and air connectors at the top of the tank;

FIG. 3 is a top view of the tank cover of the embodiment of FIG. 1 showing apertures for fluid and air connections;

FIG. 4 is a flow diagram showing the basic steps of installing the tank within a blind cavity;

FIG. 5 is a cross-sectional view of a second embodiment of a holding tank in accordance with the present invention;

FIG. 6 is a cross-sectional view of the mounting flange assembly of the embodiment of FIG. 5;

FIG. 7 is a top view, taken along lines 7—7 of FIG. 6, of the flange assembly of the embodiment of FIG. 5;

FIG. 8 is an exploded partial perspective view of the preferred relationship between the flange assembly and bags of the present invention; and FIG. 9 is a partial cross-sectional view of the bags of the present invention prior to expansion of the resin therebetween, FIG. 9 depicting an optional feature of the invention.

FIG. 10 is an enlarged cross sectional view of the antifouling element illustrated in FIG. 5; and FIG. 11 is a side elevation of a modified inner bag of the present invention provided with spacer strips.

DESCRIPTION OF THE PREFERRED EMBODIMENTS:

FIG. 1 shows the principal parts of a first embodiment of the present invention employed as a sanitary fluid holding sump. The tank or sump is generally designated at 10 installed in a blind cavity below an interior deck D. It will be understood that the interior deck shown would be near the lower portion of a boat or at least at a point below a toilet being served by the particular sump and that the interior deck very likely separates an open space above the interior deck as viewed in FIG. 1 from a blind or closed cavity below the interior deck as viewed in FIG. 2. The term "blind" as used throughout the specification refers to a space on the opposite side of the interior deck, to which access cannot be had without cutting and removing extensive portions of the interior deck.

The sanitary sump consists basically of a fluid container 12 and a two-part sump cover 14. The container 12 has a laminated construction. The outer layer of the container is a plastic bag 16 while the inner layer is a similar plastic bag 18. These plastic bags may be formed from a heavy gage (0.020 inch) vinyl film which permits the bags to support a fluid at pressures approaching 100 psi. The ability to support the fluids insures that waste materials stored within the sump will not be allowed to leak from the sump into the boat. With bags on both the inside surface of the sump and the outside surface of the sump, a redundantly sealed sump is formed.

The filler material 20 which is interposed between the two bags 16 and 18 is a self-foaming polyurethane resin. Such polyurethane compounds are well known commercially and are generally formed by mixing two components, an A part or prepolymer and a B part or resin component. As the components are mixed, the resin begins to foam and expand and upon complete curing, the cellular foam sets rigidly to provide the structural integrity of the sump 10. The foaming action is not immediate but begins about from 45 to 100 seconds after the A and B components have been mixed together and continues to foam for approximately 4 minutes.

The two-part cover 14 for the sump 10 serves as the mounting structure for the container 12 and supports the container 12 from the interior deck D. Near the central region of the cover are a fluid inlet fitting 22, a fluid emptying fitting 24, and an air vent fitting 23. The fitting 24 is removable from cover 14 and has a drop tube 26 which extends from the lower portion of the fitting 24 into the lower region of the container 12. In operation, the sump is connected to a toilet by means of a hose 25 connected to fitting 22. Waste material or fluid from the toilet passes through the hose 25 and fitting 22 into the sanitary holding sump 10 for temporary storage. Periodically, the sump is emptied into a land based sewage system by connecting a second hose to a fitting, not shown, connected to the downstream end of drop tube 26 and pumping the stored waste material out of the sump through drop tube 26 and fitting 24. During this procedure, air flows passively into sump 12 through air vent 23 to compensate for the volume of fluid removed.

The capacity of the sump will be limited only by spaces which are significantly smaller in volume than that which is required for the sump to attain its full volume. In one embodiment of the invention, the outer bag of the sump had a height of 31 inches and a width of 22 inches and the inner bag had a height of 29½ inches and a width of 20½ inches before installation, and the sump had a holding capacity of approximately 13 gallons when expanded to its full volume.

FIG. 2 discloses the details of the cover 14 for the sump 10. The cover 14 is composed of two flange elements 28 and 30. The flange elements are made from a noncorrosive material such as a polyvinyl chloride plastic. The outer flange element 30 has an annular mounting flange 32 with a cylindrical extension 34 projecting downwardly through the deck D. The outer plastic bag 16 is bonded or secured to the extension 34 of the plastic element at its peripheral edge. In a similar manner, the second flange element 28 of the cover 14 has an annular mounting flange 36 and a cylindrical extension 38 projecting downwardly into the sump 10 concentrically within extension 34. The inner plastic bag 18 is bonded or secured to the extension 38 in the same fashion as the outer bag 16 is bonded to extension 34.

The two mounting flanges 32 and 36 are congruent at their outer circumferences and contain coincident mounting holes through which mounting screws 40 pass into the deck D. As seen in FIG. 3 the screws 40 are distributed evenly around the periphery of the flanges.

FIGS. 2 and 3 show the disposition of the fittings 22 and 24 near a central plane of the cover 14. The inlet and discharge tubes 25 and 26 respectively may be plastic pipes which are inserted in tight fitting contact with the fittings 22 and 24. Fitting 24 is threaded into the element 28 so that the fitting 24 can be removed and the depending end of the tube 26 can be adjusted to terminate at a point adjacent the bottom of the sump. Alternately, it may be desirable to have disconnectable couplings incorporated on the fittings and the tubes. If the couplings are used, the tube 26 would be composed of two sections, the upper section of which would carry the coupling and the lower section of which would be permanently fastened to the fitting 24 and extend downwardly to the lower portions of the sump. The tube 26 must extend into the bottom of the sump 10 in order to scavenge most of the waste material from the sump when the sump is emptied by pumping into an external sewage system.

As seen in FIGS. 1, 2 and 3, vent tube 23 is located in the inner flange element 28 of the cover 14 to equalize the pressure within the sump with atmosphere as waste materials are emptied into and pumped out of the sump. Vent 23 also serves to vent any gases which might build up during use of the sump.

FIG. 4 discloses the process in block diagram form by which the sump 10 is installed in a blind cavity behind the deck. Generally, the outer bag 16 is first inserted into the cavity and the self-foaming synthetic resin is added while the resin is in the creaming state or the initial stages of foaming. The inner plastic bag 18 is then inserted within the outer plastic bag 16 and is filled with water to expand the inner bag; and thus also the outer bag within the cavity. The expansion of the inner bag 18 is maintained while the foaming action of the synthetic resin is occurring, and the combination of the pressure of the water in bag 18 and the foaming action cause the resin to displace and occupy all the spaces in between the two bags. Upon setting, the resin bonds to the two bags 16 and 18 thereby fixing the bags in relation to each other and to cover 14 and also defining a fixed internal volume of the sump.

With this general understanding, the installation process may be considered in greater detail. The outer bag 16 prior to installation is first heat bonded to the extension 34 of the plastic flange element 30. The bond between the bag and the extension may also be provided by an adhesive which is compatible with the plastic bag and the plastic extension 34, or by strapping, or combinations thereof. The bag 16 with the flange element 30 secured thereto is inserted through the aperture 44 shown in FIGS. 1 and 2 which is slightly larger than the cylindrical extension 34 but smaller than the circle on which the mounting holes of flanges 32 and 36 and mounting screws 40 are located. It will be understood that the only cutting necessary to install the sump 10 is that needed for the aperture 44. This aperture is substantially smaller than that necessary to accommodate a sump which cannot be installed in a deflated condition.

The bag 16 is then charged with a measured amount of the self-foaming synthetic resin while it is still in the creaming stage or initial stage of foaming. The foaming action begins approximately 45 to 100 seconds after the A and B components have been mixed.

As soon as possible after charging the outer bag with the resin, i.e. in the creaming or early foaming stage, the inner plastic bag 18 with the flange element 28 attached thereto is inserted through the aperture 44 and into the outer plastic bag 16.

The inner plastic bag 18 is then immediately filled with water to expand the inner bag 18 and thus displace the foam throughout the space between bags 16 and 18. The expansion may also be accomplished by capping of fittings 22 and 24 and introducing compressed air through the vent tube 23.

The expansion of the inner bag 18 is maintained while the foaming action of the synthetic resin 20 is completed. In accordance with the invention, the outer bag 16 is preferably sized to be slightly larger than the inner bag 18 and, as a consequence, the foaming of the resin 20 and the continued pressure of the water in bag 18 distributes the resin uniformly in the space between the outer surface of bag 18 and the inner surface of bag 16. The result is a laminated wall structure in which the resin 20 completely fills the intervening space between the bags with the resin being bonded to the bags and defining a fixed sump volume. As seen in FIG. 2, the resin 20 works up between the cylindrical extensions 34 and 38 of the flange elements 28 and 30. To insure that the resin reaches the upper regions of the sump, it is preferred that the charge of resin 20 be slightly in excess of the differential volume of the bags 16 and 18 to insure complete filling of the space between the bags.

The expansion of the inner bag 18 is maintained while the resin 20 is allowed to cure. Upon curing, the resin 20 takes a rigid form and accordingly provides the structural rigidity of the otherwise flexible sump. The screws 40 are installed during the curing process to secure the sump in its operative position. Upon the setting of the resin, the water in bag 18 is siphoned or pumped out to leave an unoccupied volume 46. The sump is then connected by means of tube 25 to the various fixtures to be serviced within the boat and tube 26 may be connected to a servicing port or fitting elsewhere in the boat.

Technical Specifications for Polyurethane Foam System used in Apparatus for Forming a Sanitary Holding Sump The rigid urethane foam employed in the above-described first embodiment of the present invention consists of two resinous liquid components, a polyisocyanate or quasi-prepolymer component and a polyol or resin component, which reacts chemically to provide a self-foaming, self-curing composition. The prepolymer (Component A) is or is similar to "Polylite 34-843" of Reichhold Chemicals, Inc., White Plains, New York 10602. Polylite 34-843 has a viscosity of 150–350 cps. at 25°C., a specific gravity of 1.23–1.25 at 25°C., and weighs approximately 10.3 lbs./gal. The resin (Component B) is or is similar to "Polylite 34-721" or "ED-1183" of Reichhold Chemicals, Inc., White Plains, N.Y. 10602. Polylite 34-721 has a viscosity of 500–1000 cps. at 20°C., a specific gravity of 1.20–1.22 at 20°C., and weighs approximately 10.1 lbs/gal. The mixing ratio of the components is 1:1 by weight or volume. Physical properties of the foam are as follows:

| | |
|---|---|
| Density, lbs./ft.$^3$ | 2.0 |
| % Closed Cells | 95 |
| K-Factor, Initial, 77°F. BTU/hr/ft.$^2$/°F. | 0.12 |
| Water Absorption, 10' Head, 77°F. 7 days, lbs./ft.$^2$ of surface area | 0.07 |
| Compressive Strength at Yield, parallel to rise, psi | 40 |
| Deflection at Yield, parallel to rise, % | 10 |
| Tensile Strength, parallel to rise, psi | 50 |
| Flammability Rating, ASTM D-1692-67T | SE 0.5 in., 11 sec. |

Referring now to FIGS. 5–8, a second and now preferred embodiment of the invention is depicted. The embodiment of FIGS. 5–8 differs from the above described embodiments in several respects. First, in the interest of enhancing the strength of the inner and outer bags, both bags are formed by cutting pieces of a proper shape from sheets of a suitable material. Two sheets are thereafter laid together flat and edge sealed to define each bag; the sealing being performed, for example, by adhesives and heat curing or radio frequency heating. The two sheets of material and the fin formed during the sealing operation may be clearly seen from FIG. 8 with the two separate sheets being depicted at 50 and 52 and the fin at 54. A nylon reinforced tape 51 bridges the inner junction between the sheets 50 and 52 and is adhered to both sheets to reinforce the bag. Due to the initial flat configuration of the bag, reinforcing ribs 56 will be formed as shown in FIG. 5 upon expansion of the two bags to define the holding tank structure. Reinforcing ribs 56 will be in both the inner and outer bags and also in the hardened foam itself.

Also in accordance with the embodiment of FIGS. 5–8, both the inner and outer bags will be formed from a nylon reinforced coated laminate; for example nylon reinforced neoprene. Preferably, the bags are laminates of neoprene rubber and nylon fibers, the inner surface of outer bag 16 and the outer surface of inner bag 18 being exposed brushed nylon fibers. The exposed fibers serve to intimately mesh with and become enclosed in the hardened foam thus forming an actual bond between the foam and the bags to create a continuous integral structural element of the foam, the inner bag and the outer bag. The inner bag will typically be comprised of a thinner gage material than the outer bag and, accordingly, will have a small degree of elasticity, for example an expansion capability of approximately 5 percent, when compared to the outer bag. The slight ability of the inner bag to expand enhances the pushing effect on the resin by the contents of the inner bag during the tank fabrication procedure.

A further difference between the embodiment of FIGS. 1–3 and that of FIGS. 5–8 resides in the use of a five-piece cover assembly in the latter embodiment. This cover assembly includes a four-piece flange device which facilities installation of the tank system by providing support and alignment functions for the two bags. The flange assembly of the embodiment of FIGS. 5–8 includes an outer flange 58 member, a compression or lock ring 60 which cooperates with flange member 58, an inner flange member 62 and a second or inner compression ring 64 which cooperates with flange member 62. It is to be noted, and as may most clearly be seen from a joint consideration of FIGS. 6–8, that both of inner and outer flange members 58 and 62 are respectively provided with pairs of oppositely disposed slots or keyways 66—66 and 67—67 which receive the fins 54 on the inner and outer bags. FIG. 8 depicts a keyway 66 in outer flange member 58.

The flange members 58 and 62 are characterized by inwardly tapering or frusto-conical surfaces as can best be seen from FIG. 6. The compression rings 60 and 64 have complementary shapes and thus can be wedged into position within their respective flange members as also shown in FIG. 6. When compared to the embodiment of FIGS. 1–3, installation of the inner and outer bags in the flange means is facilitated by the four-piece assembly of FIG. 6. The bags are placed in position with the fins 54 folded over, as shown in FIG. 8, and placed in the oppositely disposed keyways 66 and 67. Thereafter, the compression rings are inserted and pressed in, thus capturing the bags in position in their associated flange members. It is considered desirable to employ a suitable adhesive between the bags and flange assemblies or friction produced by mechanical clamping under pressure so as to insure capture and adherence of the bags to both the flange members and associated compression rings. It will be noted that maximum tank strength requires that the seams or fins on the inner and outer bags be aligned with one another and the flange means are provided with positioning indicia, which will be described below, which insures this requisite orientation.

It is contemplated that each bag, flange and lock ring will be factory assembled so that the user will be supplied with three basic components — two bag assemblies (bag, flange element and lock ring) and a cover plate 78.

The pair of slots 66-66 in member 58 are both in the same semicircle — i.e. they are both on the same side of the diameter of member 58 with one edge of each slot being on the diameter. Similarly, the pair of slots 67—67 in member 62 are also on the same side of the diameter of member 62 with one edge of each slot being on the diameter. The folded fins 54 are placed in the slots 66 and 67 so that the seams (i.e. the junction lines between the sheets forming the bags) are at the edge of the slots on the diameter of the members 58 and 62. Since the seams of both bags are thus assured to be on the diameters of elements 58 and 62, proper alignment between the bags is assured even if one of the bag assemblies is rotated 180° with respect to the other during assembly by the user.

The aforementioned positioning means comprises two locating holes, such as holes 68, formed in a recessed, inner lip portion 70 of outer flange member 58 (see FIG. 7). Inner flange member 62 has an outwardly extending portion 72 which has a diameter slightly less than the diameter of the lip portion 70 of flange member 58. Flange portion 72 of member 62 is provided with a depending locating pin 74. In the assembly process, the inner flange member 62, with the inner bag suspended therefrom, is merely positioned over flange member 58 so that the pin 74 drops into one of the locating holes 68 whereupon the seams in the two bags will be aligned (see FIG. 6) regardless of which hole 68 is populated by pin 74.

As may be seen from a joint consideration of FIGS. 6 and 7, the outer flange member 58 is also provided with a plurality of holes about its periphery. Some of these holes are countersunk and are used for the attachment of the outer flange member to the deck D via screws 40 as shown. The other holes 76 are provided with threaded inserts, not shown, and are employed in the mounting of a cover member, indicated generally at 78, over the flange members. The cover member includes suitable fittings whereby the air vent conduit 23 and the input and outlet conduits 25 and 26 may be attached.

Inner flange member 62 is also provided with a hole 80. As may be seen from FIG. 6, in the installed position and before attachment of the cover member 78 there will be communication between the space between inner and outer bags 18 and 16 and the deck via hole 80. Hole 80 serves to vent the air between bags 16 and 18 displaced by the distribution of the foam during expansion of the inner bag. Also, if the amount of resin employed exceeds that necessary to fill the voids between the inner and outer bags to the desired thickness, excess resin will be forced upwardly between the outer diameter of the downwardly extending portion 81 of flange member 62 and the compression ring 60 and spill over through hole 80 which may have an overflow hose connected thereto if desired. The direction of flow of the resin is indicated by arrows on FIG. 6. It is to be noted that hole 80 is sufficiently small such that outer bags offers less resistance than exit through hole 80. It may also be noted that, in the interest of enhancing strength of the assembly, portion 81 of flange member 62 is provided with a plurality of downwardly extending ribs 82 and the void between these ribs and compression ring 60 will be filled with hardened plastic material when the assembly is completed.

The cover or cap assembly of the embodiment of FIGS. 5–8 includes, as previously noted, a separate piece 78 which will typically have formed, as an integral part thereof, the fittings 22 and 24 respectively for connection to the input and outlet conduits. Cover 78, as well as the two-flange members and the two compression or locking rings, will be molded of polyvinyl chloride when the invention is to be employed as a sanitary sump or water holding tank. When the invention is to be employed as a fuel tank the flange components will typically be fabricated from glass filled nylon, or stainless steel or similar fuel resistant materials, and the bags will typically be fabricated from Bunan, viton, urethane, or similar fuel resistant materials. The tube 26 which extends from fitting 24 to the bottom of the tank has been omitted from FIG. 6 in the interest of clarity. Tube 26 will be attached by suitable means, for example an adhesive or thermal assisted bond, to a downward extension 24' of cover 78. In order to insure against the end of tube 26 being blocked, for example by being sucked against the wall of the inner bag 18, an anti-fouling element indicated generally at 84 is attached to the end of exhaust tube 26. The anti-fouling element 84 has a first tubular end and an outer diameter commensurate with the inner diameter of tube 26. The tubular end of member 84 is inserted into tube 20 and is sealed thereto by suitable means. The anti-fouling member 84 also has an intermediate flange section 86 characterized by a diameter in excess of the outer diameter of conduit 26. A tapered finger 88 extends from flange portion 86. The anti-fouling member is designed such that the length of finger 88 relative to the inner diameter of tube 26 will be sufficient to insure that there will always be a fluid supply to the tube 26 and the tube end will not be sucked against the side of the tank. To that end, and as may be seen from FIG. 10, the distance ($h$) from the juncture of flange 86 and finger 88 normal to the line ($l$) between the end finger 88 and the furthermost edge of flange 86 is greater than the inner diameter ($d$) of tube 26.

In the embodiment of FIGS. 1–3 a self-forming resin was discussed. However, to minimize temperature and pressure effects, it is also possible and, in fact, preferable to employ a fully pre-expanded liquid foam whereby there will be no further expansion of the resin material after it has been inserted into the outer bag 16. In selecting a suitable pre-expanded foam material, it is essential that the foam chosen have a density less than the medium, typically water, which is employed to expand the inner bag 18. Thus, in the example where water is employed as the means to expand bag 18, the pre-expanded foam employed should have a density not greater than 1.0 in order to obtain the desired hydrostatic displacement. A suitable pre-expanded foam for use with the present invention is a syntactic polyester foam comprised of a polyester resin in combination with a catalyst and a structural filler. In one reduction to practice of the invention, the following materials were employed:

Resin-Polylite 91-928
   90 percent by weight, two-thirds by volume
   Manufacturer — Reichhold Chemicals, Inc. Mass. MA
Catalyst - Lupersol 224
   ¾ percent by weight of resin
   Manufacturer — Lucidol Division Pennwalt Corporation Buffalo, N.Y.
Structural Filler — phenolic microballoons BJO - 0930
   10 percent by weight, one-third by volume
   Manufacturer — Union Carbide Chemicals and Plastics, Inc. Clifton, N.J.

The above composition is a liquid with microballoons, or hollow spheres, in suspension. It is possible to practice the invention using mixtures of one or two resins, with beads or balls in suspension, in association with a suitable catalyst. For certain resin blends it has also be found to be desirable to employ an accelerator such as cobalt naphthanate.

To review the technique of fabricating a holding tank in accordance with the present invention, and particularly in relation to the embodiment of FIGS. 5–8 employing a pre-expanded foam, a first step obviously comprises the cutting of the requisite size hole in deck D. The outer and inner bags 16 and 18 are attached to their respective flange members 62 and 58 via respective locking rings 64 and 50 and/or with the aid of adhesives. During installation of the bags in their respective flanges, care is taken to insure that the fins formed during the bag manufacturing process are folded over and inserted in the keyways 66 and 67 in the flange members. The flange member 58 with the outer bag installed therein is attached to the deck via screws 40. The syntactic polyester foam formulation is mixed by adding the catalyst to the resin-structural filler blend and the foam is inserted into bag 16. The flange member 62, with the inner bag 18 attached, is placed over flange member 58 so that the integral pin 74 mates with one of the positioning holes 68 in flange member 58. The fins or seams on the inner and outer bags will now be aligned with the bags positioned one within the other. The inner bag will next be filled with a measured amount of water thereby causing the inner and outer bags to expand and the resin to be forced into the configuration defined by the contours of the blind compartment. As a result of the difference in size of the inner and outer bags and the pressure of the water, the foam will flow into all voids between the inner and outer bags to thereby define a container having walls of at least a predetermined thickness. Any excess resin will be forced out through hole 80 in flange member 62. The foam material will gell in a relatively short period of time, 45 minutes in the example composition given above, and will completely set in 2 hours. After the resin has set, the water may be pumped out of inner bag 18 and the cover member 78 installed. Thereafter, the tank may be pressurized with a source of compressed gas in order to test its structural integrity.

As has been previously indicated, it is contemplated that each bag with its flange member and locking ring will be supplied as components of a factory assembly. Of course, these components could be left for assembly by the user, but the factory assembly is preferred. In either event, it is important to prestress the bags to provide for load distribution in the neck of the bag, i.e. at the juncture of each bag with its flange element. To this end, each bag is inserted into its flange element and pulled up — i.e. stressed or loaded, at two diametrically opposed stations 90° from the fins before the locking ring is fully seated. The excess material resulting from this pulling up is then trimmed off.

Although not absolutely required, in some installations it is deemed desirable to employ a highly porous coating on either the inner surface of the outer bag of the outer surface of the inner bag. This optional feature is depicted in FIGS. 9 and 11. In some installations there may be a slight danger that outer bag 16 will be pressed against inner bag 18, particularly along the fins 54, thereby impeding or even blocking the flow of the foam. In order to insure that this will not occur, a porous or permeable spacer material 90 may be coated on one or both of the facing surfaces of the inner and outer bags. A typical such spacer material, which will always permit the foam to pass therethrough thus forcing the bags apart, may be a rubberized hogs hair spacer material produced by Blocksom and Company. If employed, the spacer material 90 would typically be applied, for example with a suitable adhesive, to the outer surface of the inner bag 18 in the form of strips as shown in FIG. 11. It is preferable to apply the spacer material in the form of spaced strips on the outer surface of both bag sheets with the strips in staggered relationship as shown in the full lines and dotted lines representing the strips on both sheets. The staggered relationship appears to aid in assuring good distribution of the foam since each strip tends to drive the foam up the opposed space on the other sheet.

While preferred embodiments of the present invention have been shown and described, it will be understood that various modifications and substitutions may be made thereto without departing from the spirit and scope of the invention. Thus, for example, the self-expanding foam of the embodiment of FIGS. 1–3 may be employed with the flange assembly of the embodiments of FIGS. 5–8 and vice-versa. It is believed most noteworthy that the invention permits the installation of a fluid holding tank through an aperture which need be large enough only to accommodate the cover or flange member and the tank will conform to whatever space limitations are imposed within a blind cavity. Of course, the ability of the tank to conform to various shapes may be utilized in many cases whether the cavities themselves are blind cavities or not. Accordingly, it will be understood that the present invention has been described by way of illustration rather than limitation.

What is claimed is:

1. A sanitary holding sump comprising:
   a container with an opening on one side having a laminated construction including an outer envelope, an inner envelope and rigid plastic foam filling the space between the inner and outer envelopes;
   said inner and outer envelopes being plastic bags that are flexible prior to lamination with said foam; and
   a sump cover positioned in the opening of the container, said cover including inner and outer circular flange elements, said inner flange element being joined to the inner envelope and said outer flange element being joined to the outer envelope.

2. A sanitary holding sump of claim 1 wherein:
   the first and second flange elements of the sump cover have overlapping mounting flanges.

* * * * *